Jan. 12, 1926.
J. A. KINNEY
1,569,501
BUCKET DUMPING APPARATUS
Filed August 23, 1921
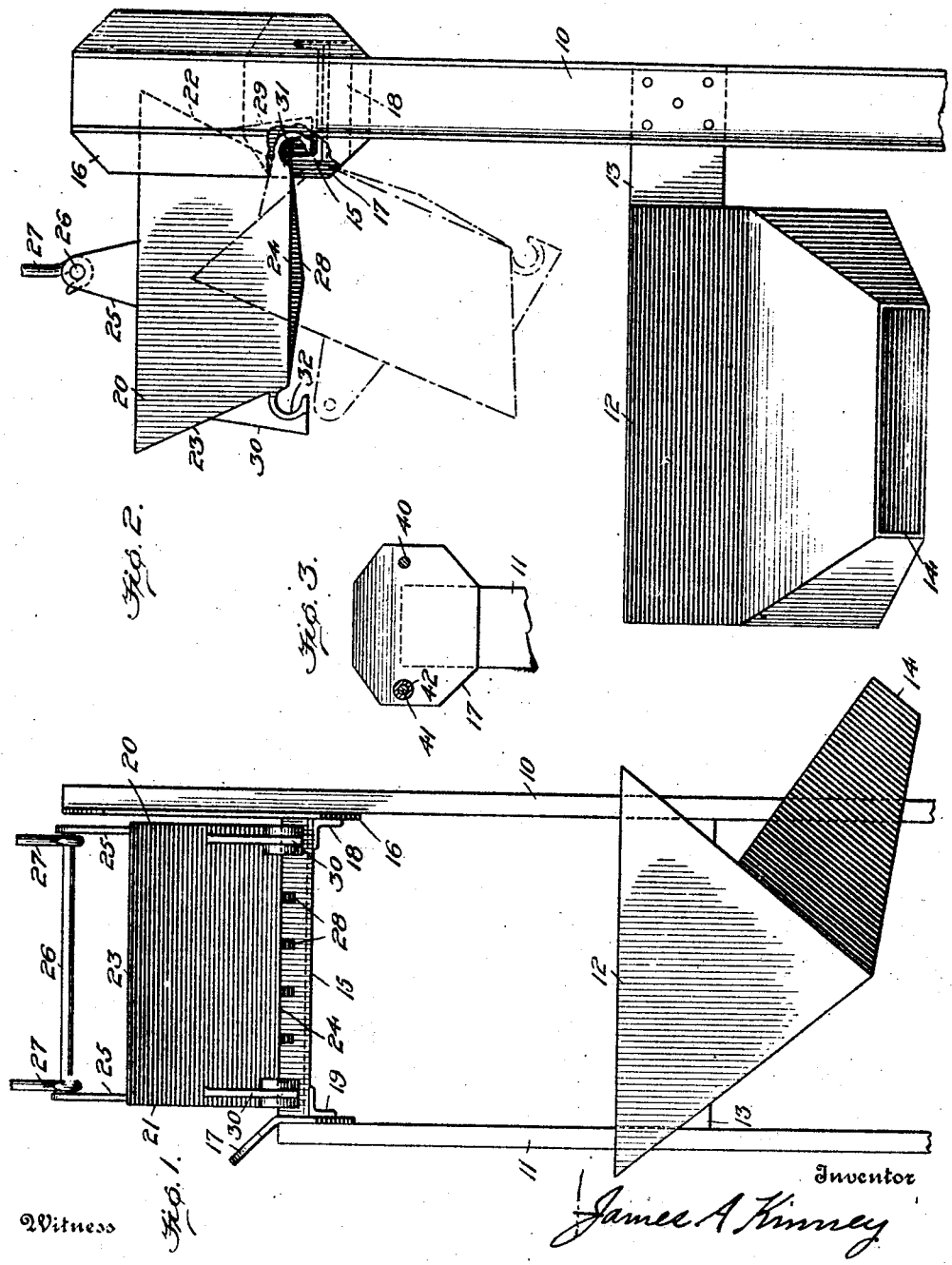

Patented Jan. 12, 1926.

1,569,501

UNITED STATES PATENT OFFICE.

JAMES A. KINNEY, OF LEBANON, PENNSYLVANIA, ASSIGNOR TO BETHLEHEM STEEL COMPANY, OF BETHLEHEM, PENNSYLVANIA, A CORPORATION OF PENNSYLVANIA.

BUCKET-DUMPING APPARATUS.

Application filed August 23, 1921. Serial No. 494,586.

*To all whom it may concern:*

Be it known that I, JAMES A. KINNEY, a citizen of the United States, and residing at Lebanon, Lebanon County, State of Pennsylvania, have invented certain new and useful Improvements in Bucket-Dumping Apparatus, of which the following is a specification.

In factories and manufacturing plants having automatic screw machinery, turret lathes and similar machines for the reproduction automatically or semi-automatically of bolts, nuts, screws, washers, and similar articles, it is an important consideration to collect and dispose of the product of such machine with a minimum of inconvenience to the operator and with a minimum of labor on the part of other attendants. Usually these rapidly operating machines discharge the product in a finished condition at a certain point and by placing a bucket or receptacle at the point of discharge, the finished units may be collected. This bucket is removed when filled and replaced by an empty bucket, the filled bucket being transported either to a storage bin or to a second machine designed to perform a further operation on the product of the first machine at which place the bucket is dumped and returned empty to be used again. Buckets for containing metal articles, such as bolts, nuts, screws or washers, are usually of metal and when loaded have a very considerable weight, rendering their unloading, even by skilled operatives, a clumsy and difficult operation. Usually the buckets have been transported by travelling cranes and dumped manually by operatives.

It is the object of the present invention to provide an apparatus by means of which such loaded buckets on arriving at their destinations may be quickly dumped and without being touched by operators stationed on the floor, the entire dumping operation being guided solely by the crane man or operator of the travelling crane. The invention contemplates the utilization of an especially constructed dumping stand which is provided with means to guide the bucket suspended from a crane to dumping position and other means adapted to cooperate with the bucket itself to effect automatic tilting of the bucket as it is lowered by the crane man to discharge its contents into a suitable hopper.

The invention may have various embodiments and in the accompanying drawings one form is illustrated:

Figure 1 is a front view of a dumping stand showing the bucket in position to be dumped;

Figure 2 is a side view of the same; and

Figure 3 is a section through a portion of the stand showing a modification of one detail.

The stand comprises essentially two uprights 10 and 11 which are preferably channel members and may be firmly imbedded in concrete or strongly supported in any other suitable manner. The hopper 12 is supported by means of a bracket 13 to one side of the frame, the inlet of the hopper being substantially rectangular in outline and arranged in a horizontal plane and an outlet 14 being located at one side and designed to have an effective area particularly advantageous with reference to the particular articles to be discharged therefrom. The stand may be arranged so that the hopper discharges into a storage bin or it may be arranged to discharge on to a platform adjacent a machine for performing an additional operation on the product of the machine from which the articles are received, or the hopper itself may serve as a storage bin.

The upright 11 is considerably shorter than the upright 10 and extending horizontally from the top of upright 11 toward the upright 10 is a channel member 15, the flanges of which are upwardly directed as shown in dotted lines in Figure 2. Interposed between the ends of the channel 15 and uprights 10 and 11, however, are plates 16 and 17 which are secured to the uprights and which in turn support angle members 18 and 19 upon which the ends of channel bar 15 rest. The plate 16 extends upwardly to the top of upright 10 and is flat throughout while plate 7 is shorter and the portion thereof above the cross piece 15 is upwardly and outwardly inclined. These plates constitute guide plates for assisting in positioning the bucket preparatory to dumping.

The bucket is rectangular in horizontal cross section having parallel vertical sides 20 and 21, upwardly and outwardly inclined ends 22 and 23, and a flat bottom 24. Brackets 25 positioned at the middle points of the sides extend upwardly therefrom and support a horizontally disposed cross rod 26 about which the hooks 27 on the ends of the chains or ropes of a travelling crane or other suspending means may be detachably fastened. The bottom of the bucket has secured thereto a plurality of skids 28, these skids being parallel to the sides of the bucket and the lower surfaces of which are inclined upwardly from the center of the bucket toward the ends, as shown in Figure 2.

Secured to the inclined ends 22 and 23 are legs 29 and 30, there being preferably two of these legs at each end of the bucket, and each leg having its inner edge cut away as at 31 and 32 respectively.

In the operation of the apparatus the loaded bucket is lowered by the crane men until it is positioned above the dumping stand. While freely suspended the bucket may of course swing or rotate, but when brought into the position in which it is illustrated in Figure 1, the guide plates 16 and 17 cooperate in bringing it into proper dumping position, that is bringing the rod 26 into parallelism with the cross piece 15. The plate 17 guides the bucket toward the plate 16 and this latter plate cooperates with either flat side of the bucket in positioning the same, the bucket being properly positioned when the plate 16 and the adjacent side of the bucket are parallel. The operator then lowers the bucket so that the skids 28 strike the forward flange of channel 15, the initial line of contact being between legs 29 and the center of the bucket, so that the bucket moves horizontally toward the hopper, due to the inclination of the skids, until the legs 29 strike the forward flange of the channel bar.

Further lowering of the bucket results in its rotation about this flange as a pivotal axis from its full line to dotted line position (Figure 2) and the contents thereof will then fall into the hopper 12. The bucket may then be raised and returned to the machine for another load.

In Figure 3 a modification of the stand is illustrated. Here in place of a channel member such as 15, two horizontal transverse rods 40 and 41 are used, the forward rod 41 being surrounded by a rotatable sleeve 42 constituting an antifriction roller. This enables the bucket to move forward horizontally more freely into dumping position. The rear rod 40 prevents dumping of the bucket in the reverse direction in case it should strike the roller 42 with its center of gravity behind this roller instead of in front of the same. In the case of the channel bar the rear flange forms a similar function.

From the foregoing description it is thought that the many advantages of the invention in manufacturing plants and factories will be realized and it will also be apparent to one skilled in the art that numerous changes may be made in the design and arrangement of the parts of the invention without departing from its scope.

Having thus described the invention what is claimed as new and desired to be secured by Letters Patent is:

1. In a device of the class described, in combination, a dump bucket adapted to be suspended for vertical movement from a travelling crane and having one or more downwardly extending projections at one side of its center of gravity, and a dumping stand having a substantially horizontal stationary cross piece and means rigidly supported on the stand for guiding the bucket into dumping position as it is lowered, so that the cross piece will be engaged by the projection extending downwardly from the bucket and the bucket will be constrained to tilt about the cross piece as it is lowered, to effect the discharge of its contents.

2. In a device of the class described, in combination, a dump bucket having a substantially vertical flat side wall and adapted to be suspended for vertical movement from a travelling crane and having one or more downwardly extending projections to one side of its center of gravity, and a dumping stand having a substantially horizontal cross piece and plate means supported on the stand and extending above the cross piece to cooperate with the flat side of the bucket in guiding the bucket into dumping position as it is lowered, so that the cross piece will be engaged by the projection extending downwardly from the bucket and the bucket will be constrained to tilt about the cross piece as it is lowered to effect the discharge of its contents.

3. In a device of the class described, in combination, a dump bucket adapted to be suspended for vertical movement from a travelling crane, said bucket being rectangular in horizontal cross section and having parallel substantially vertical sides, two projections extending downwardly from the bottom of the bucket, one on each side of its center of gravity, and a dumping stand having a substantially horizontal cross piece and plates which converge downwardly relatively to each other and supported on the stand adjacent to the ends of the cross piece for cooperation with either flat side of the bucket in guiding the bucket into dumping position as it is lowered so that the cross piece will be engaged by one of the projections which extend downwardly from the bucket whereby the bucket will be constrained to tilt about the cross piece as it is lowered, to effect the discharge of its contents.

4. In a device of the class described, in combination, a dump bucket adapted to be suspended by a vertical hook from a travelling crane, said bucket having bearing surfaces on its bottom sloping upwardly in opposite directions from a line through its center of gravity and having downwardly extending projections, one on each side of said line, and a dumping stand having a substantially horizontal cross piece and means supported on the stand for guiding the bucket to dumping position as it is lowered so that the crosspiece will be engaged by the inclined bearing surfaces of the bucket and the latter guided horizontally until the downwardly extending projections engage the cross piece whereupon the bucket will be constrained to tilt about the cross piece upon being lowered and the discharge of its contents effected.

5. In a device of the class described, in combination, a dump bucket adapted to be suspended for vertical movement from a travelling crane and having a downwardly extending projection to one side of its center of gravity, a dumping stand having spaced parallel substantially horizontal cross pieces, one of said cross pieces comprising a fulcrum adapted to be engaged by the catch on the bucket to cause the bucket to pivot thereabout as it is lowered, and the other cross piece comprising a guard to prevent tilting of the bucket in the reverse direction.

6. In a device of the class described, in combination, a dump bucket adapted to be suspended for vertical movement and horizontal movement from a travelling crane, and a dumping stand, said bucket and stand having cooperating means whereby the bucket is guided to dumping position and the dumping thereof effected, said means including inclined skids on the bottom of the bucket and a member with which such skids cooperate to secure lateral movement of the bucket to a tilting position.

7. In a device of the class described, in combination, a dump bucket adapted to be suspended for vertical movement and horizontal movement from a travelling crane, and a dumping stand, said bucket and stand having cooperating means whereby the bucket is guided to dumping position and the dumping thereof effected, said means including inclined skids on the bottom of the bucket, projections extending downwardly from the bucket, and a bar on the stand adapted to be primarily engaged by said inclined skids whereby horizontal movement of the bucket is obtained, and to be secondarily engaged by the downwardly extending projections to effect tilting of the bucket in the manner described.

8. A stand of the class described, including in combination, a hopper, a horizontal cross bar above and to one side of said hopper, and means supported on the stand for guiding a descending bucket into operative engagement to said cross bar to effect the tilting of the bucket and the discharge of its contents into the hopper.

9. A stand of the class described, comprising a hopper, spaced parallel members above and to one side of said hopper, said members being substantially horizontal and the member adjacent the hopper having an antifriction roller for guiding a descending bucket toward the hopper and constituting also a fulcrum about which the bucket may tilt in discharging its contents, the second of said members constituting a guard for preventing tilting of the bucket in the opposite direction.

In testimony whereof I hereunto affix my signature.

JAMES A. KINNEY.